United States Patent
Kroos et al.

(10) Patent No.: US 9,382,820 B2
(45) Date of Patent: Jul. 5, 2016

(54) METHOD FOR PRODUCING A BUILT HOLLOW VALVE

(71) Applicant: Mahle International GmbH, Stuttgart (DE)

(72) Inventors: Peter Kroos, Rutesheim (DE); Christoph Luven, Stuttgart (DE); Alexander Mueller, Wildberg (DE); Alexander Puck, Esslingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/300,938

(22) Filed: Jun. 10, 2014

(65) Prior Publication Data

US 2014/0360452 A1 Dec. 11, 2014

(30) Foreign Application Priority Data

Jun. 11, 2013 (DE) .......................... 10 2013 210 899

(51) Int. Cl.
| | |
|---|---|
| *B23K 26/28* | (2014.01) |
| *F01L 3/20* | (2006.01) |
| *B23P 15/00* | (2006.01) |
| *B23K 15/00* | (2006.01) |
| *B23K 26/08* | (2014.01) |

(Continued)

(52) U.S. Cl.
CPC ............... *F01L 3/20* (2013.01); *B23K 15/0053* (2013.01); *B23K 15/0093* (2013.01); *B23K 26/08* (2013.01); *B23K 26/282* (2015.10); *B23K 26/285* (2013.01); *B23K 31/125* (2013.01); *B23P 15/002* (2013.01); *F01L 3/12* (2013.01); *B23K 2201/003* (2013.01); *B23K 2201/006* (2013.01); *Y10T 29/49307* (2015.01); *Y10T 29/49774* (2015.01)

(58) Field of Classification Search
CPC .. B23K 26/08; B23K 15/0093; B23K 31/125; B23K 15/0053; B23K 26/285; B23K 2201/006; B23K 2201/003; B23P 15/002; F01L 3/20; F01L 3/12; Y10T 29/49774; Y10T 29/49307
See application file for complete search history.

(56) References Cited

U.S. PATENT DOCUMENTS

| 2,371,548 A | 3/1945 | Saffady |
| 6,354,258 B1 | 3/2002 | Abele et al. |

(Continued)

FOREIGN PATENT DOCUMENTS

| DE | 19804053 A1 | 8/1999 |
| DE | 10257505 A1 | 7/2003 |

(Continued)

OTHER PUBLICATIONS

English abstract for DE102004010309.

(Continued)

*Primary Examiner* — Ryan J Walters
(74) *Attorney, Agent, or Firm* — Fishman Stewart PLLC

(57) ABSTRACT

A method for producing a hollow valve of an internal combustion engine may include providing a hollow valve stem, a valve cone, and a valve bottom; pushing the valve cone over the valve stem via a press fit, wherein the valve cone includes an outer surface transitioning to the valve stem to define a testing surface; and welding the valve cone to the valve stem via at least one of a laser beam and an electron beam, wherein the welding occurs such that no melting of the outer surface in the region of the testing surface of the valve cone occurs.

20 Claims, 1 Drawing Sheet

(51) Int. Cl.
   *B23K 31/12*       (2006.01)
   *F01L 3/12*        (2006.01)

(56)           References Cited

U.S. PATENT DOCUMENTS 6,484,584 B2 *  11/2002  Johnson ............... B23K 31/125
                                                         73/624
   7,240,895 B2 *   7/2007  Abele ........................ F01L 3/20
                                                         123/188.3
   7,592,566 B2 *   9/2009  Maura .................. H01H 11/041
                                                         219/121.64
   7,603,976 B2    10/2009  Abele 2003/0121488 A1   7/2003  Abele et al.
   2003/0209218 A1 * 11/2003  Baur .................... B22D 17/007
                                                         123/188.2
   2008/0272325 A1 * 11/2008  Schlegl ..................... F01L 3/20
                                                         251/318

FOREIGN PATENT DOCUMENTS

DE      102004010309 A1    9/2005
   DE      102005027130 A1   12/2006

OTHER PUBLICATIONS

Germany Search Report for DE-102013210899.0, dated Sep. 30, 2013.

* cited by examiner

METHOD FOR PRODUCING A BUILT HOLLOW VALVE

CROSS-REFERENCE TO RELATED APPLICATIONS

This application claims priority to German Patent Application DE 10 2013 210 899.0 filed Jun. 11, 2013, which is hereby incorporated by reference in its entirety.

TECHNICAL FIELD

The present invention relates to a method for producing a built hollow valve. The invention additionally relates to a hollow valve produced according to this method.

BACKGROUND

From DE 198 04 053 A1 a lightweight construction valve for an internal combustion engine with a ratio of wall thickness to stem diameter of less than 1:3 is known. This is to minimise a deformation of the valve head. According to an embodiment, a valve cone in this case is formed unitarily welded to a valve stem and according to another embodiment welded to the valve stem via a welded connection.

From DE 10 2004 010 309 A1 a further hollow valve with a hollow valve stem and a valve disc is known, wherein a valve cone is welded to the valve stem and to the valve bottom.

In order to satisfy steadily rising safety requirements it is also necessary with built hollow valves to create a testing surface located at the transition of the valve cone to the valve stem, via which the built hollow valve for example can be subjected to a quality test by means of ultrasound. The testing surface on the one hand has to be smooth and on the other hand so large that a weld seam depth can be entirely covered. When welding-together the valve cone and the valve stem merely an uneven weld seam course can be achieved up to now, which does not make possible reliable and reproducible testing of the weld seam or only under very difficult conditions so.

SUMMARY

The present invention therefore deals with the problem of stating a method for producing a built hollow valve, by means of which the hollow valve can be produced so that in the produced state it can be subjected to a required quality test without problem.

According to the invention this problem is solved through the subjects of the independent claims. Advantageous embodiments are subject of the dependent claims.

The present invention is based on the general idea of producing a built hollow valve of an internal combustion engine with a valve stem, a valve cone and a valve bottom in such a manner that when welding the valve cone to the valve stem no melting of an outer surface of the valve cone occurs, so that in this case a testing surface which does not have to be further processed and which is optimally configured is ready for quality testing the hollow valve. With the method according to the invention the valve cone is initially pushed over the valve stem of the hollow valve with a press fit, wherein following this the valve cone is welded to the valve stem by means of a laser namely in such a manner that no melting of the outer surface of the valve cone takes place. For this purpose, the laser during the welding of the valve stem to the valve cone is held so that a laser beam of the laser assumes an angle of $\alpha<25°$ with respect to the axis of the valve stem. Through this comparatively flat holding of the laser relative to the valve stem it can be reliably prevented that the valve cone is melted on its outer surface and because of this the future testing surface there is impaired. Up to now, a clearance fit between the valve cone and the valve stem was provided in the production of conventional hollow valves in order to be able in particular to easily push the valve cone onto the valve stem. Through the gap formation that occurred during the process the laser beam however had to be started at a greater angle relative to the axis of the valve stem in order to be able to ensure safe welding. The larger angle of the laser beam relative to the axis of the valve stem also caused melting of the outer surface of the valve cone, as a result of which producing a smooth testing surface was no longer possible. With the method according to the invention by contrast an even weld seam running evenly about the circumference of the valve stem can be produced, wherein at the same time the testing surface which is required in particular for a test required in USA can be maintained.

With an advantageous further development of the solution according to the invention the weld seam produced by means of the metal according to the invention can be subsequently tested by means of ultrasound. Testing of the produced weld seam makes possible quality testing of the produced hollow valve and because of this produces the hollow valve subject to maintaining maximum quality standards. In particular, a testing surface with a width of $a \geq 0.5$ mm can be achieved through the method according to the invention, which is mandatorily required for carrying out a reproducible quality test.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically

DETAILED DESCRIPTION

Figure 1:
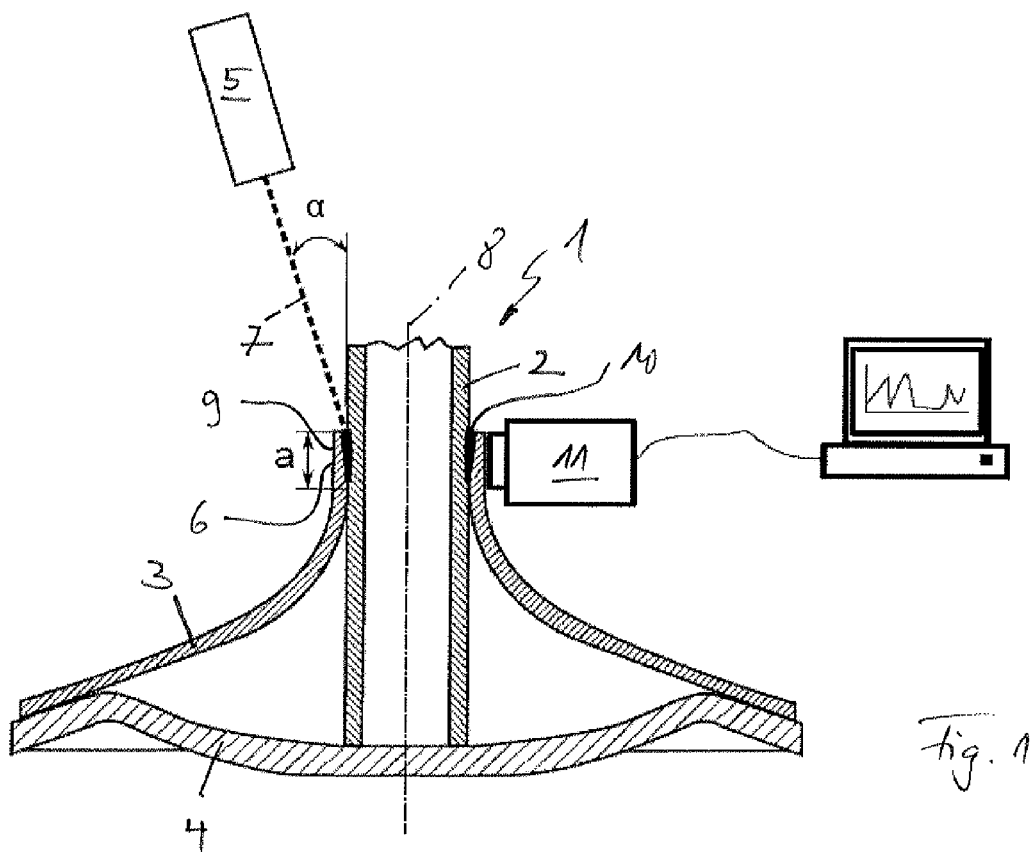
FIG. 1 a hollow valve according to the invention during its production.

According to FIG. 1, a method for producing a built hollow valve 1 of an internal combustion engine which is not otherwise shown is shown, wherein the hollow valve 1 comprises a valve stem 2, a valve cone 3 and a valve bottom 4. The valve cone 3 in this case is pushed or pressed over the valve stem 2 with a press fit and subsequently welded to the valve stem 2 by means of a laser 5, wherein welding takes place in such a manner that no melting of the outer surface 6 of the valve cone 3 occurs. Press fit of the outer surface 6 of the valve cone 3 in this case is to mean an outer surface of the valve cone 3. This effect is achieved in that a laser beamelectron beam 7 of the laser 5 during the welding assumes an angle of $\alpha<25°$, preferentially even an angle of α<20° to the axis 8 of the valve stem 2. Prior to the pressing-on of the valve cone 3 onto the valve stem 2 that takes place in the method step a.), the valve stem 2 for example can be welded to the valve bottom 4. Obviously, in this case, a unitary formation of the valve stem 2 together with the valve bottom 4 is also conceivable. Following the welding of the valve stem 2 to the valve cone 3, additional welding of the valve cone 3 on the edge side to the valve bottom 4 is usually performed.

Figure 2:
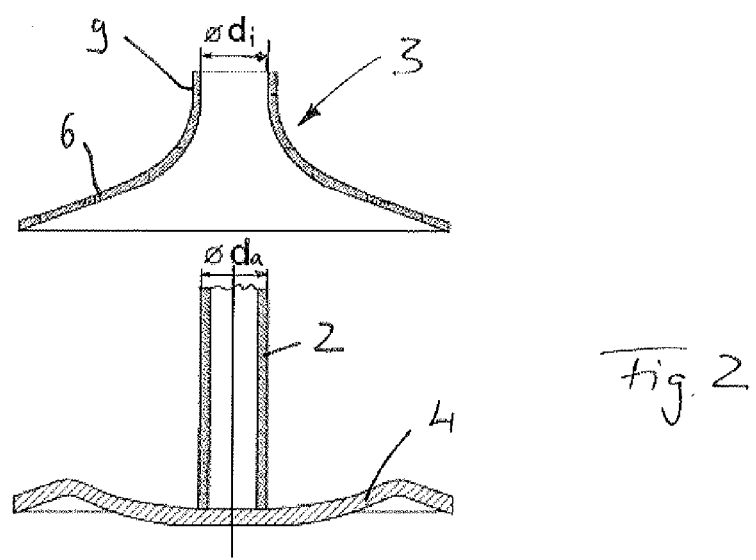
FIG. 2 an exploded representation of the hollow valve according to the invention for explaining the press fit between valve cone and valve stem.

The press fit between the valve stem 2 on the one hand and the valve cone 3 on the other hand in this case usually amounts to between 0.02 mm and 0.11 mm. Thus, the outer diameter $d_a$ of the valve stem 2 would be approximately 0.02 mm to 0.11 mm larger than inner diameter $d_i$ of the valve cone 3 according to FIG. 2.

Through the method according to the invention an optimised and smooth testing surface can be additionally created on the outer surface 6 of the valve cone 3, the axial depth a or width of which amounts to at least 0.5 mm and maximally 1.5 mm. Here, the axial depth a is to be larger than an axial depth of the weld seam 10 produced by the laser beam 7, so that the latter is completely covered and can be tested for example by means of an ultrasound testing device 11.

Through the method according to the invention, a weld seam 10 can also be produced, which is formed symmetrically. Through the acute angle between the laser beamelectron beam 7 and the axis 8 of the valve stem 2 the testing surface 9, i.e. the outer surface 6 in this region, remains unimpaired and because of this optimally prepared for subsequent quality testing, in particular ultrasound testing.

Through the press fit between the valve cone 3 and the valve stem 2 no gap is created, which might have occurred there up to now, which requires a significantly larger angle α of the laser beam 7. Through the press fit it is thus possible to hold the laser 5 in an extremely flat manner with respect to the axis 8 of the valve stem 2 and nevertheless produce a high-quality weld seam 10. At the same time, the flat electron beam of laser beam 7 prevents melting of the valve cone 3 in the region of the testing surface 9, so that following the production of the hollow valve 1 according to the invention an ultrasound test by means of an ultrasound testing device 11 can directly take place, without the testing surface 9 having to be additionally worked or prepared for this purpose. With the method according to the invention a high-quality and reproducibly testable production of hollow valves 1 is thus possible.

The invention claimed is:

1. A method for producing a hollow valve of an internal combustion engine, comprising:
   providing a hollow valve stem having a longitudinal center axis, a valve cone and a valve bottom,
   pushing the valve cone over the valve stem via a press fit connection between an outer diameter of the valve stem and an inner diameter of the valve cone, wherein the valve cone includes an outer surface disposed radially outside of the press fit connection in relation to the longitudinal center axis, the outer surface transitioning to the valve stem to define a testing surface, and
   welding the valve cone to the valve stem at the press fit connection via at least one of a laser beam and an electron beam, wherein the welding forms a weld seam between the outer diameter of the valve stem and the inner diameter of the valve cone without melting the outer surface of the valve cone in a region of the testing surface.

2. The method according to claim 1, wherein the at least one of the laser beam and the electron beam during the welding maintains an angle of less than 25° with respect to the longitudinal center axis of the valve stem.

3. The method according to claim 1, further comprising testing the weld seam at the testing surface via ultrasound.

4. The method according to claim 1, further comprising welding the valve stem to the valve bottom prior to pushing the valve cone over the valve stem.

5. The method according to claim 1, wherein prior to welding the valve cone to the valve stem, further comprising welding the valve cone to the valve bottom.

6. The method according to claim 1, wherein the testing surface includes a width having an axial depth of 0.5 mm to 1.5 mm.

7. The method according to claim 1, wherein the at least one of the laser beam and the electron beam is held at an angle of less than 20 degrees with respect to the longitudinal center axis of the valve stem.

8. The method according to claim 1, wherein the weld seam formed via welding the valve cone to the valve stem is symmetrical and extends circumferentially about the valve stem at the press fit connection.

9. The method according to claim 1, wherein the weld seam and the testing surface are aligned with each other in a radial direction with respect to longitudinal center axis of the valve stem.

10. A method of assembling a hollow valve for an internal combustion engine, comprising:
   providing a hollow valve stem defining a longitudinal center axis and having an outer diameter, a valve cone having an outer surface defining an opening having an inner diameter, and a valve bottom, wherein the outer diameter of the valve stem is greater than the inner diameter of the opening of the valve cone;
   inserting the valve stem through the opening of the valve cone via a press fit connection between the outer diameter of the valve stem and the inner diameter of the valve cone, wherein the outer surface in a region of the opening defines a testing surface;
   welding the valve cone to the valve stem at the press fit connection via at least one of a laser beam and an electron beam, wherein the at least one of the laser beam and the electron beam is held at an angle of less than 25 degrees with respect to the longitudinal center axis of the valve stem to produce a weld seam interposed between the outer diameter of the valve stem and the inner diameter of the valve cone without melting the testing surface, wherein the weld seam is covered by the testing surface, and wherein the testing surface defines a first axial depth and the weld seam defines a second axial depth.

11. The method according to claim 10, the first axial depth is larger than the second axial depth.

12. The method according to claim 11, wherein the first axial depth is between 0.5 mm and 1.5 mm.

13. The method according to claim 10, wherein the weld seam symmetrically extends around a circumference of the valve stem.

14. The method according to claim 10, further comprising welding the valve stem to the valve bottom prior to inserting the valve stem through the valve cone.

15. The method according to claim 10, further comprising welding the valve cone to the valve bottom prior to welding the valve cone to the valve stem.

16. The method according to claim 10, wherein welding the valve cone to the valve stem occurs without melting the testing surface of the valve cone.

17. The method according to claim 10, wherein the outer diameter of the valve stem is approximately 0.02 mm to 0.11 mm greater than the inner diameter of the valve cone.

18. The method according to claim 10, further comprising testing the weld seam at the testing surface via an ultrasound testing device.

19. A method of producing a hollow valve for an internal combustion engine, comprising:
- providing a valve stem defining a longitudinal center axis and having an outer diameter, a valve cone defining an opening having an inner diameter, and a valve bottom, wherein the outer diameter of the valve stem is greater than the inner diameter of the valve cone;
- disposing the valve stem in the opening of the valve cone so that a press fit connection forms at the opening between the outer diameter of the valve stem and the inner diameter of the valve cone, wherein the valve cone has an outer surface defining a testing region disposed radially outside of the press fit connection with respect to the longitudinal center axis; and
- welding the valve cone to the valve stem at the press fit connection via at least one of a laser beam and an electron beam, wherein the at least one of the laser beam and the electron beam is held at an angle of less than 25 degrees with respect to the longitudinal center axis of the valve stem and produces a weld seam interposed between the outer diameter of the valve stem and the inner diameter of the valve cone without melting the testing region of the outer surface of the valve cone, wherein the weld seam and the testing region are aligned with each other in a radial direction with respect to the longitudinal center axis of the valve stem.

20. The method according to claim 18, further comprising at least one of:
- welding the valve bottom to the valve cone; and
- testing the weld seam at the testing surface via an ultrasound testing device.

* * * * *